(No Model.)
O. B. SHALLENBERGER.
SYSTEM OF ELECTRICAL DISTRIBUTION FOR STREET LIGHTING.
No. 411,970. Patented Oct. 1, 1889.
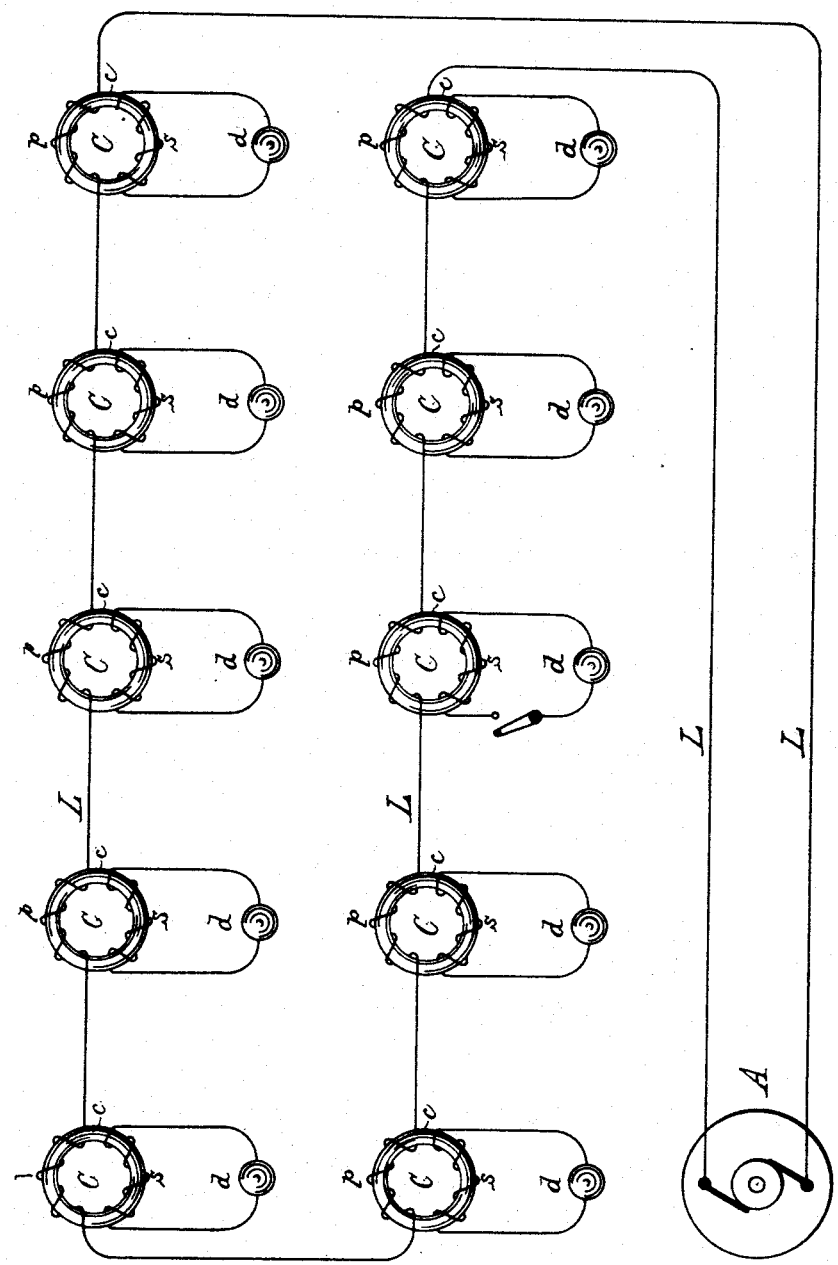
WITNESSES:
INVENTOR,

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

SYSTEM OF ELECTRICAL DISTRIBUTION FOR STREET-LIGHTING.

SPECIFICATION forming part of Letters Patent No. 411,970, dated October 1, 1889.

Application filed October 16, 1888. Serial No. 288,285. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Systems of Electrical Distribution for Street-Lighting, (Case No. 236,) of which the following is a specification.

The invention relates to the organization of circuits and apparatus for distributing electric currents.

The special object of the invention is to provide convenient and economical means for operating isolated incandescent electric lamps or other translating devices requiring electric currents of moderate potential, and at the same time to secure the advantages pertaining to systems of electrical distribution and conversion known as "alternate-current" or "secondary" systems. In operating translating devices by these systems it is customary to transmit currents of very high tension to points within the immediate vicinity of the translating devices, and at such points to reduce the potential of the currents as may be required by means of electric converters connected in multiple arc. When, however, only a single translating device is required at any given point, as is the case with street-lighting circuits, for instance, the employment of such a potential-reducing converter in connection with each translating device usually involves more expense than is warranted, and therefore it becomes necessary either to employ secondary conductors of sufficient length to include several more or less widely-separated translating devices, or else to connect the converters in series. The use of long secondary conductors is objectionable, because they are necessarily of much greater size than the primary conductors, and therefore more expensive; and prior to my invention the series plan was considered impracticable, because no economical method had been discovered whereby converters suitable for supplying single incandescent lamps could be so operated.

My invention consists in so proportioning the coils and core of each of a number of converters, which have their primary coils connected in series, in an alternating-current electric circuit, and their secondary coils respectively including in their circuits an incandescent lamp or other translating device, that, when the lamp is in circuit and receiving its proper current, sufficient current will be allowed to traverse the primary coil of each converter to supply all the remaining converters in circuit, and when the secondary circuit of any converter is interrupted a consequent high magnetic saturation of the core will cause the reactive effect of the primary coil to be so modified as to oppose to the current an effective resistance approximately equivalent to that which exists when the lamp is in circuit. The converters may be constructed to develop a difference of potential at the terminals of the secondary coil equal to that applied to the primary—that is to say, the lengths of the primary and secondary coils may be equal. The total difference of potential applied to the series of converters will then be equal to the sum of the difference of potential required for the individual lamps.

In the accompanying drawing there is shown in diagram an organization of apparatus illustrating the invention.

Referring to the figure, A represents a suitable source of alternating, intermittent, or pulsatory electric currents, and L its circuit. In the circuit any convenient required number of electric converters C C are included in series. These are designed to supply currents to the corresponding translating devices $d$ $d$, respectively. The primary coils $p$ of the converters are included in the circuit L, while the secondary coils $s$ are connected through the corresponding translating devices. Electric energy is transferred from the primary coil to the secondary coil through the instrumentality of a core $c$ of soft iron, the coils and the core being disposed in any convenient manner. The core $c$ is preferably constructed of laminated soft iron, forming closed magnetic circuits.

It will be evident that if several devices of the character described are connected in series currents of high potential, and consequently wires of small cross-section, may be employed for supplying them.

When the secondary circuit of an electric converter as ordinarily constructed is open, a counter electro-motive force is developed in the primary coil sufficient to greatly reduce the current flowing through it. I have found, however, that by properly proportioning the coils and core it is possible to develope when the secondary is closed and the normal difference of potential is applied to the primary a counter electro-motive force which in one aspect is the equivalent of a given definite resistance, and when the secondary circuit is open to cause the core to attain such a point of high magnetic saturation that a normal amount of current will still be allowed to pass, so that the remaining lamps will not be affected by the cutting out of any one or more lamps. In other words, the converter is so proportioned that the same amount of current will flow through its primary coil under the influence of the normal difference of potential upon the circuit whether the secondary circuit be open or closed through the lamp.

Two factors must be considered in the determination of the effective resistance offered by the counter electro-motive force—first, its difference of potential, and, second, the displacement of its phases with reference to those of the applied electro-motive force. If the counter electro-motive force were equal to the applied electro-motive force and the phases of the two were synchronous, then the two forces would neutralize each other and no current would flow; but if the phases of the counter electro-motive force are subsequent to those of the appplied electro motive force, then they do not exactly neutralize each other and a current flows, the phases of which are displaced with reference to the phases of the applied electro-motive force. The effective resistance is therefore diminished. From this it follows that an equivalent effective resistance may be maintained up to a certain limit by increasing by the proper amount the displacement of the phase as the counter electro-motive force is increased; or, in other words, an increase in counter electro-motive force may be compensated by a corresponding displacement of phase and the same effective resistance maintained.

When a high magnetic saturation of the core of a converter is attained, the counter electro-motive force is itself increased; but its phases are sufficiently displaced with reference to the phases of the applied electro-motive force to restore to the circuit an amount of energy sufficient to compensate for such increase and to thus maintain the normal current value. The energy consumed is not equal to the product of the electro-motive force into the current; but these two factors must be multiplied by a third factor depending upon the displacement of phase. The point of saturation is approached as the ratio of current to the difference of potential begins to increase, or high magnetic saturation may be defined as the point at which the rise in the effective counter electro-motive force is very small in proportion to that of the applied electro-motive force, owing to the magnetic lag of the core. With a properly-proportioned converter, therefore, the current may be maintained at practically the normal amount whether the lamps or other translating devices are in circuit or not without either increasing or decreasing the electro-motive force of the circuit. In cases where the converters have been operated in series prior to my invention it has been necessary, in order to maintain a constant current, to vary the difference of potential upon the circuit to compensate for every change in the resistance of the secondary circuit of any converter. In practicing my invention both the difference of potential upon the circuit and the current are maintained constant, since the effective resistance of the circuit is maintained practically constant.

In practice the proportioning of the converters and general organization will depend upon the particular conditions of different systems. Very good results are obtained by the following organization: Nineteen converters connected in series in a circuit supplied by a current of one thousand volts having sixteen thousand alternations per minute, and each converter constructed with like primary and secondary coils, and as follows: length of each coil, one hundred and forty feet; length of so-called "active wire" in each coil, about seventy-five feet; number of turns in each coil, one hundred and two; size of wire, No. 15 B. & S. gage; resistance of each coil, .403 ohms; core, four and one-fourth inches in length, composed of three hundred and twenty thin plates of soft iron, insulated by paper, and of the general character described in United States Patent No. 373,029, the size of the plates being three and three-fourths inches by two and one-fourth inches, and the weight of iron being four pounds, each converter normally having connected in its secondary circuit an incandescent electric lamp designed to receive a current of 1.45 ampères at a pressure of approximately fifty volts.

It is evident that variations in the different conditions may require variations in the proportioning of the various parts; but from the instructions hereinbefore given those skilled in the art will be able to practice the invention.

I claim as my invention—

1. The combination, with a circuit supplied by alternating electric currents, of two or more electric converters having their primary coils connected in series in said circuit, and an incandescent electric lamp or other translating device connected in the secondary circuit of each converter, the coils of the converters being so proportioned to the mass of iron in the corresponding cores that upon the interruption of the circuit through any lamp a normal current is allowed to pass through the other converters by reason of the high magnetic saturation of the core of the corresponding converter.

2. In a series system of secondary distribution, a converter so proportioned that the self-induction of its primary with open secondary is the equivalent of the resistance of the translating devices normally on the secondary circuit.

3. In a series system of electrical secondary distribution, converters having their primary coils so proportioned that the inductive opposition to the current is approximately the same when the secondary is open as when the secondary is closed through its normal circuit.

In testimony whereof I have hereunto subscribed my name this 2d day of October, A. D. 1888.

OLIVER B. SHALLENBERGER.

Witnesses:
W. D. UPTEGRAFF,
CHARLES A. TERRY.